United States Patent [19]

Lumelleau

[11] 4,355,000
[45] Oct. 19, 1982

[54] LIGHTWEIGHT, REMOVABLE GATE SEAL

[75] Inventor: Adrian Lumelleau, Bronxville, N.Y.

[73] Assignee: The Presray Corporation, Pawling, N.Y.

[21] Appl. No.: 151,323

[22] Filed: May 19, 1980

Related U.S. Application Data

[63] Continuation of Ser. No. 954,978, Oct. 26, 1978, abandoned.

[51] Int. Cl.³ .............................................. G21C 13/00
[52] U.S. Cl. .................................... 376/205; 376/272
[58] Field of Search .................... 176/30, 87; 376/205, 376/272

[56] References Cited

U.S. PATENT DOCUMENTS

| | | |
|---|---|---|
| 3,397,490 | 8/1968 | Carlson . |
| 3,518,355 | 6/1970 | Luce . |
| 3,745,707 | 7/1973 | Herr . |
| 3,935,062 | 1/1976 | Keller et al. .......................... 176/30 |
| 3,984,942 | 10/1976 | Schrath . |
| 4,042,828 | 8/1977 | Rubinstein et al. ................ 176/30 X |
| 4,070,240 | 1/1978 | Kugler et al. ..................... 176/30 X |
| 4,078,968 | 3/1978 | Golden et al. ......................... 176/87 |
| 4,078,969 | 3/1978 | Garin ..................................... 176/87 |
| 4,096,392 | 6/1978 | Rubinstein et al. ............. 250/518 X |

FOREIGN PATENT DOCUMENTS 856952 12/1960 United Kingdom .................. 176/87

Primary Examiner—Peter A. Nelson
Attorney, Agent, or Firm—Mandeville and Schweitzer

[57] ABSTRACT

In a nuclear fuel reactor well, storage pool or the like, a lightweight, removable pneumatic action sealing means is disclosed for providing a leak-tight seal between the walls of said well and an access gate. The sealing means comprises a lightweight metallic beam structure removably supported by the gate and arranged between the gate and portions of the adjacent wall. Inflatable sealing members are mounted on the lightweight beam structure and are operable when the gate is in a locked position to expand between the gate and wall, thereby forming a leak-tight seal. The beam structure includes connector flanges so that a hoisting apparatus may be attached to the lightweight structure to lift the entire sealing means from the gate for repair, maintenance or replacement.

11 Claims, 8 Drawing Figures

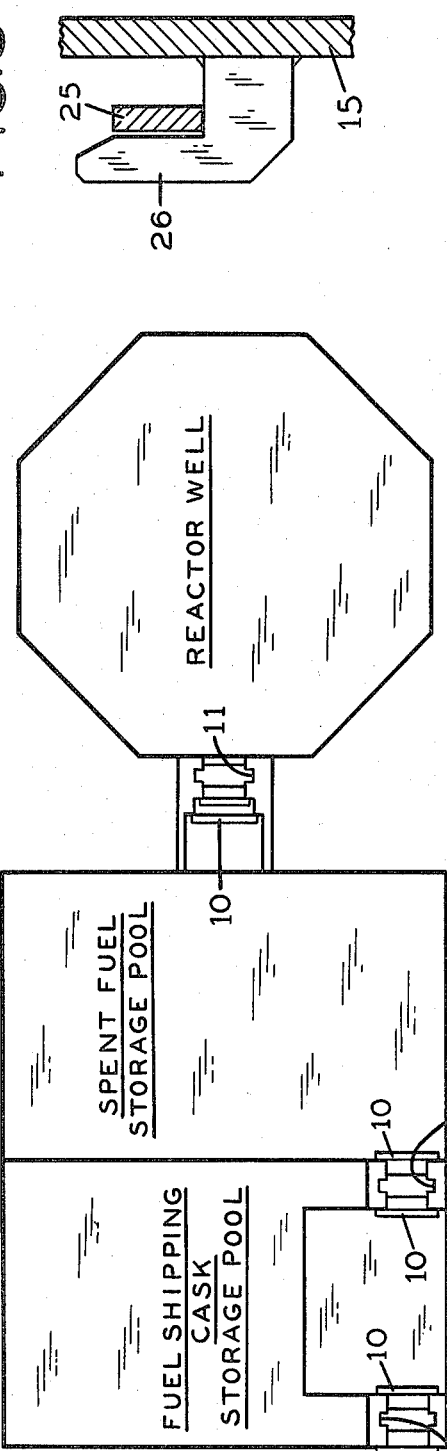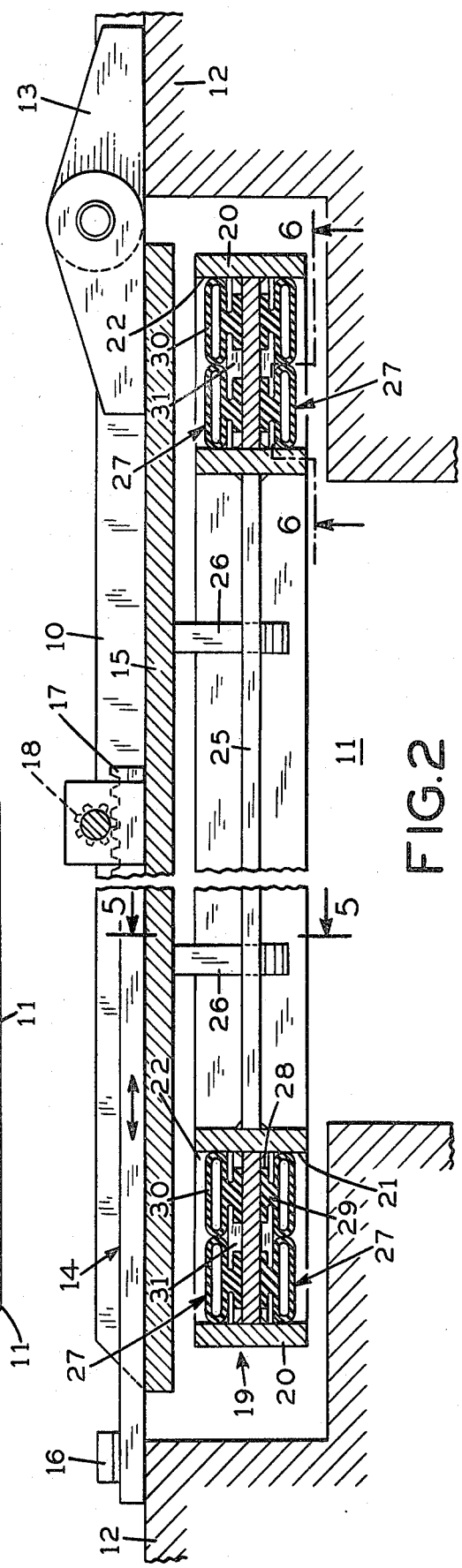

U.S. Patent Oct. 19, 1982 Sheet 2 of 3 4,355,000
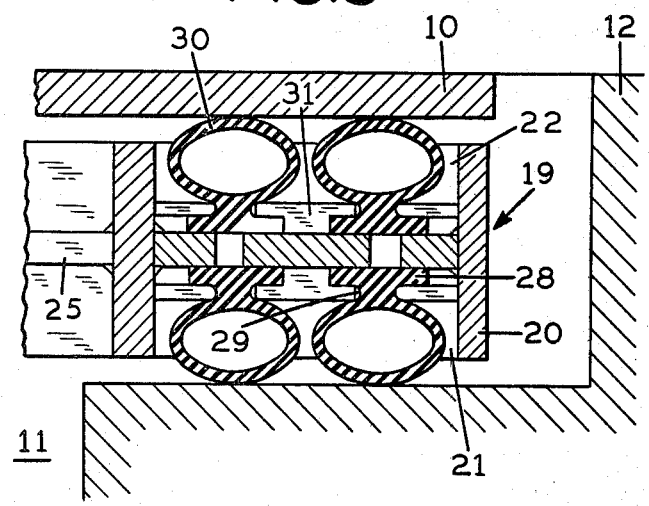
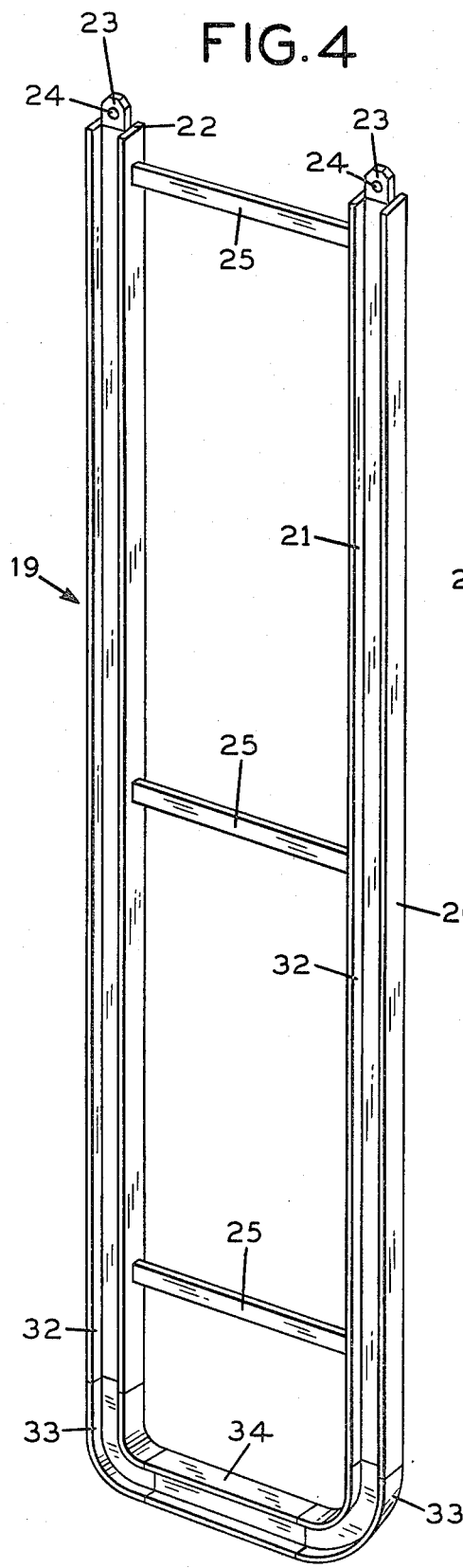
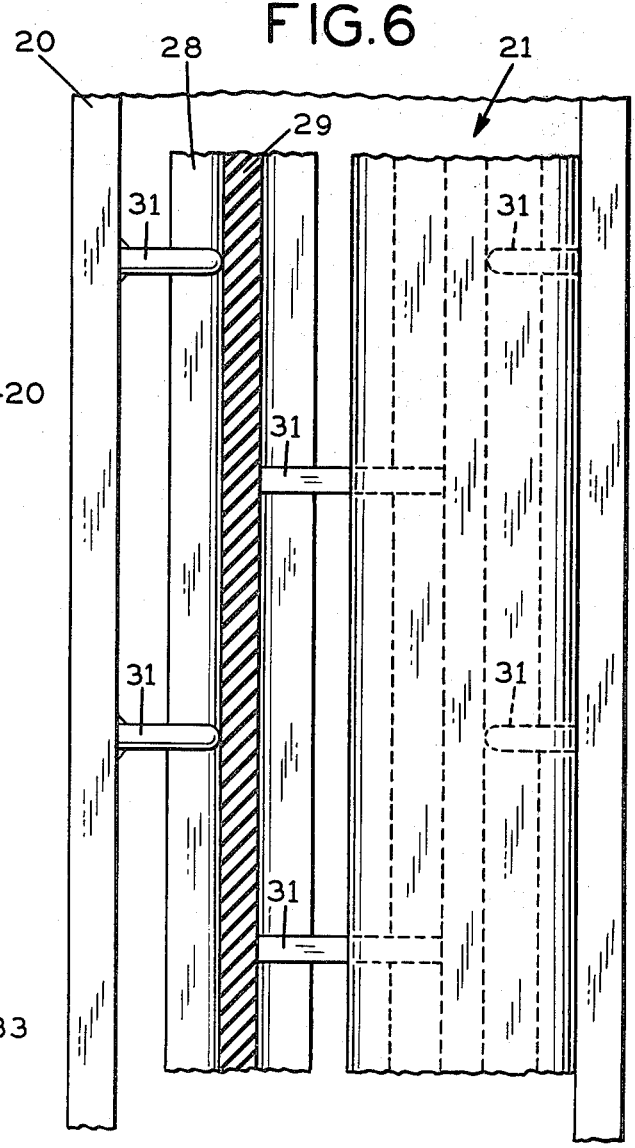

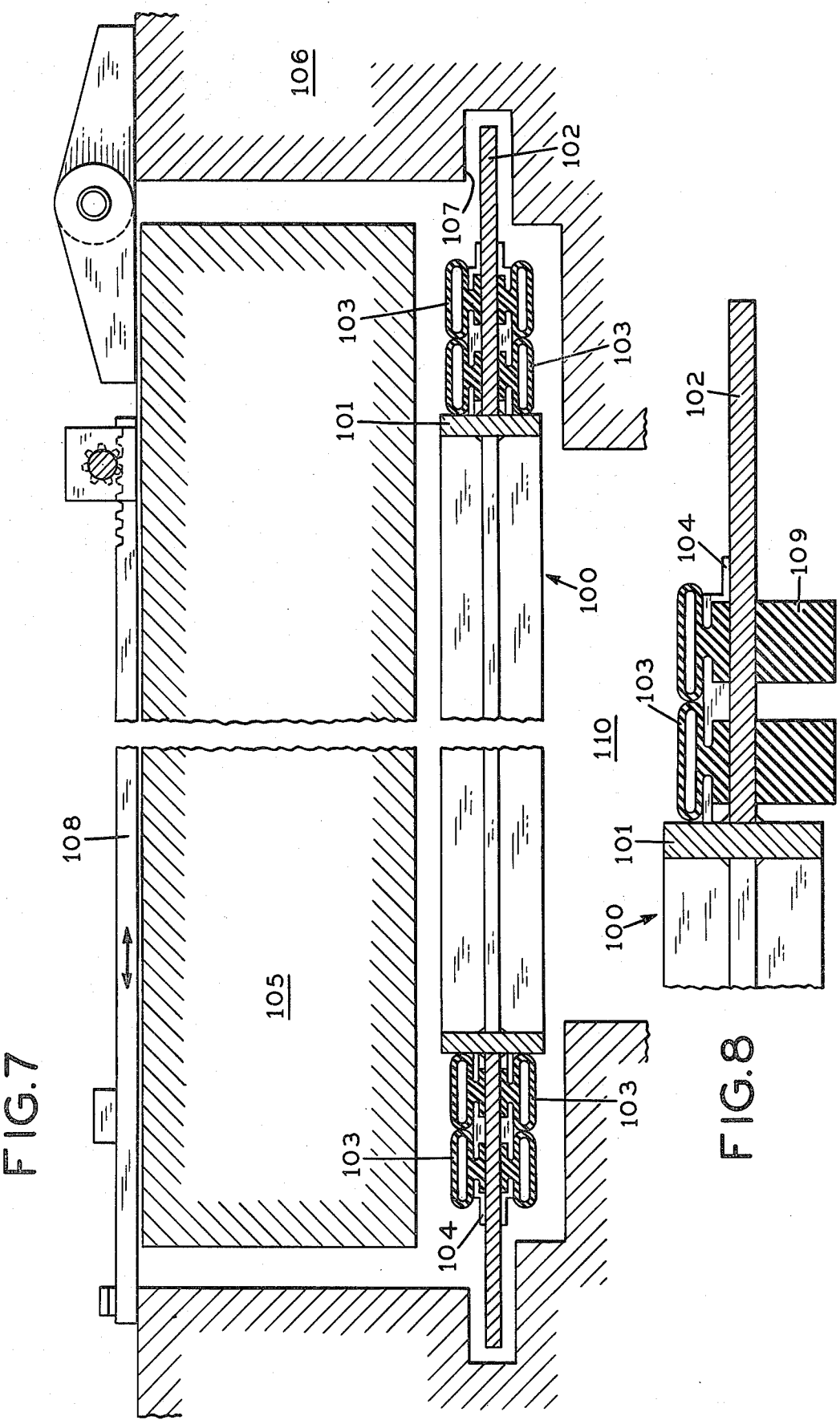

LIGHTWEIGHT, REMOVABLE GATE SEAL

This is a continuation of application Ser. No. 954,978, filed Oct. 26, 1978, and now abandoned.

BACKGROUND AND SUMMARY OF THE INVENTION

The present invention is related to a gate seal, and more particularly to a lightweight, removable sealing means operable to provide a fluid-tight seal between a gate and the wall of a reactor well or storage pool.

In certain designs of nuclear-reactor generating plants, for example, there are large reactor well and storage pool structures wherein nuclear fuels are either stored or arranged in a reactor apparatus. These pools or wells are typically filled with a fluid, such as water, to isolate the fuels from the surrounding environment and serve as a protective outer structure for the nuclear fuel material. In order to provide access to the interior of a single well or pool or to provide connecting passageways between the various structures, the liners and walls of the structures are provided with openings including heavy, thick-walled gates to close off the openings. It is, of course, necessary that the gates be in a fluid-tight relation with the pool liner to insure the leakproof integrity of the pool structure when the gate is closed. Due to the critical nature of the desired sealing relation, it is essential that the sealing means be highly reliable and effective in providing the leak-tight seal and at the same time be easily accessible and removable for routine repair, maintenance and eventual replacement. An initial problem encountered in providing a sealing means with the above-described features is the size of the storage pool and reactor well structures.

These structures are typically very large and are housed within a single building. The gates and sealing means are also of rather heavy construction and of large dimensions. To afford economical construction of the nuclear power plant, and to comply with applicable safety regulations, the outer building is designed to offer sufficient protection for the various apparatuses of the plant, but does not possess the structural strength or space required to support heavy duty hoisting and hauling machinery. Thus, it is not feasible to provide equipment capable of bodily removing an entire gate structure, in order to secure or replace the seals.

It is accordingly one of the primary objectives of the present invention to provide a new form of gate sealing means which is ideally suitable for use in connection with access gates for reactor wells and fuel storage pools of a nuclear reactor power plant, for example. In accordance with the broadest aspects of the invention, there is provided a sealing means comprising a lightweight, frame structure removably mounted between the gate and portions of the pool wall when the gate is in a closed position. The frame structure is arranged to support continuous yieldable, expansible sealing members which are connectable to a source of fluid under pressure. After the gate has been closed and locked, the pressure fluid is admitted to inflate the sealing members and expand them in a manner to form a fluid-tight seal between the inner surface of the gate and the wall of the pool or well.

In one advantageous form of the invention, the beam structure comprises a generally U-shaped, I-beam with transverse members extending between the spaced vertically disposed leg portions. The gate is provided with support elements engageable with the transverse members of the beam structure to support the beam on the gate. A plurality of inflatable sealing elements are arranged along the entire length of the U-shaped I-beam and are inflated after the gate is closed to form the desired leak-tight seal. The beam structure and inflatable seals provide a lightweight, easily removable sealing means to facilitate maintenance, repair and/or replacement of the inflatable sealing members. At the same time, the pneumatic sealing means is highly effective in providing a reliable leak-tight seal between the gate and the pool wall.

For a better understanding of the above and other features and advantages of the invention, reference should be made to the following detailed description of preferred embodiments of the invention and to the accompanying drawings.

BRIEF DESCRIPTION OF THE DRAWINGS

FIG. 1 is a highly simplified schematic diagram of an arrangement for a nuclear fuel reactor well and storage pool with access gate structures.

FIG. 2 is a horizontal cross-sectional view of a gate utilized in the nuclear power plant of FIG. 1 and including sealing means constructed in accordance with the principles of the present invention.

FIG. 3 is an enlarged cross-sectional view of one end of the sealing means of FIG. 2 depicted in a sealing relation to the gate and reactor well wall.

FIG. 4 is a perspective view of a beam structure of the sealing means of the present invention.

FIG. 5 is a partial cross-sectional view of the gate and sealing means, as taken generally along line 5—5 of FIG. 2.

FIG. 6 is a front, partial cross-sectional view of the sealing member and beam structure, as taken generally along line 6—6 of FIG. 2.

FIG. 7 is a horizontal cross-sectional view of a modified form of the gate and sealing means of the present invention.

FIG. 8 is an enlarged, fragmentary cross-sectional view of a gate arrangement incorporating a further modification of the present invention.

DETAILED DESCRIPTION OF PREFERRED EMBODIMENTS OF THE INVENTION

Referring now to the drawings, and initially to FIG. 1, there is illustrated in schematic form the general arrangement for a nuclear reactor building unit. The unit includes several storage pool and reactor well structures each including passageways 11 for access either to the interior of an individual structure or between adjacent structures. The pool and well structures are designed to provide a safe environment for nuclear fuels and are generally filled with water to isolate the fuels from areas surrounding the nuclear power plant. Accordingly, the access passageways 11 are each provided with a gate 10 to seal off the interior of the particular reactor well or the like.

As can be seen in FIG. 2, each gate 10 is a heavy, thick-walled member which is generally congruent in shape to the cross-section of the access passageway 11 of the reactor well wall 12. The gate 10 is supported at one side by a hinged member 13 mounted to the wall 12 whereby the gate 10 may be swung from the closed position illustrated in FIG. 2 to an opened position generally at right angles to the wall 12 to provide unobstructed access to the reactor well interior.

In order to securely lock the gate 10 when it is in a closed position, a laterally movable latching member 14 is slidably supported on a ledge 15 formed across the width of the gate 10. A bracket 16 is provided on the wall 12 at the portion thereof facing the swinging end of the gate 10 whereby the laterally movable latching member 14 may be moved partially into the bracket 16 to lock the gate 10. To advantage, the laterally movable member 14 is provided with a rack portion 17 in meshing engagement with a gear 18. The gear 18 is suitably connected to an actuator (not shown) and is rotatable to slide the movable member 14 between unlocked and locked positions.

In accordance with the present invention, a lightweight beam structure 19 is provided as a support for a sealing means for the gate 10. To advantage, the beam structure 19 is made from lightweight stainless steel sections and in a typical installation may be approximately 25' high and 4' wide. As is clearly illustrated in FIG. 4, the beam structure 19 comprises a generally U-shaped I-beam 20 defining outwardly facing, continuous channels 21, 22. The U-shaped configuration may be made from several preformed I-beam sections 32, 33, 34 connected together, as for example by welding.

A pair of tabs 23 extend one from each the outer ends of the I-beam 20 and each tab 23 includes an eyelet 24. In this manner, the lightweight beam structure 19 may be attached to a hoisting apparatus for lifting and movement about the nuclear plant. A plurality of transverse members 25 extend between the spaced leg portions of the U-shaped I-beam 20. These members 25 provide structural support and also serve as a means for removably attaching the beam structure 19 to the gate 10 as will be described.

A plurality of hanger brackets 26 are mounted on the inner side of the gate 10 as, for example, by welding, whereby the beam structure 19 may be supported on the gate 10 by placing the transverse members 25 on the brackets 26. The access passageway 11 of the reactor well is configured such that there is a region of enlarged width at the outermost portion of the passageway 11 so that when the gate 10 is in a closed and locked position, the mounted beam structure 19 is disposed between the locked gate 10 and reactor well wall 12 and within the enlarged region of the passageway 11. Two pair of elongated, continuously flanged tubular sealing elements 27 are mounted along the entire length of the continuous channels 21, 22 such that one pair is disposed in each channel 21, 22 with each sealing element 27 of one pair being in a side-by-side relation to the other sealing element 27 of the pair. The initial or deflated cross-sectional configuration of each sealing element 27 is as shown in FIG. 2 and includes a solid flange portion 28, a neck portion 29 and a hollow, inflatable section 30.

As is clearly illustrated in FIG. 2, the above-described arrangement for the channels 21, 22 and sealing elements 27 provides a continuous sealing means around the perimeter of the gate 10 and between the gate 10 and reactor well wall 12. One pair of sealing elements faces the inner surface of the gate 10 and the other pair faces the well wall 12. Thus, upon inflation of the sealing elements, a leak-tight seal may be formed between the gate 10 and well wall 12. The side-by-side arrangement of each pair insures that if one sealing element 27 should become defective, the second element 27 of the pair will maintain the seal.

The entire sealing means is easily removable from the gate 10 by simply deflating the sealing elements, attaching a hoisting apparatus to the lifting tabs 23, and lifting the beam structure 19 off the brackets 26. The lightweight, U-shaped configuration provides a structure which is easy to handle and transport within the nuclear power plant while the inflatable sealing elements 27 are operable to provide a highly reliable seal between the gate 10 and wall 12, as will be described in more detail hereinbelow.

Referring now to FIG. 3, the sealing elements 27 are shown in an inflated condition whereby the back-to-back elements 27 and the I-beam 20 form a seal extending between the gate 10 and wall 12 and running along the entire perimeter of the gate 10. The tubular inflatable section 30 of the sealing elements 27 may be inflated by any suitable connection (not shown) to a source of air pressure (not shown). For example, an opening may be formed through the lining of the inflatable section 30 for insertion of an air tube connected to the source of air pressure. Such an arrangement is described in the Schroth U.S. Pat. No. 3,984,942 which is hereby expressly incorporated by reference. After the gate 10 is locked, the source of air pressure may be actuated to inflate the sections 30 causing the sealing elements 27 to expand into sealing contact with the gate 10 and wall 12, thereby forming a leak-tight seal between the gate 10 and wall 12.

To advantage, the sealing elements 27 are secured within the channels 21, 22 by a series of flange-receiving clips 31. As shown in FIG. 6, the clips 31 are mounted within the channels 21, 22 and are arranged in staggered relation, alternately facing in opposite directions. To mount the continuous sealing elements 27, the element is inserted into the channel 21, 22 by progressively bending the sealing element back and forth between the alternate clips 31 and inserting the flange 28 under the clips 31. For a more detailed description of the alternately facing clip arrangement, reference should be made to the Carlson U.S. Pat. No. 3,397,490.

Referring now to FIG. 7, there is illustrated a modification for the sealing means of the present invention. The beam structure 100 comprises a generally U-shaped beam 101 which is T-shaped in cross-section. Thus, the beam structure 100 includes an outwardly extending flange portion 102 for supporting the inflatable sealing elements 103, as for example, by staggered clips 104. In this manner, the flange portion 102 may serve as a locating fin for the beam structure 100. When the structure 100 is lowered into position between the gate 105 and reactor well wall 106, the side areas of the flange portion 102 are guided into longitudinally extending slot-like passages 107 formed in the reactor wall 106 at the periphery of the access passageway 110. This arrangement will facilitate the raising and lowering movement of the beam structure 100 by insuring that the structure does not drift or rotate as it is being moved.

In other respects, the sealing means of FIG. 7 is similar to the sealing means of FIGS. 1–6. The beam structure 100 may be supported by the gate 105 or by any other suitable means and the sealing elements 103 are inflatable to form a leak-tight seal between the gate 105 and reactor well wall 106. Of course, the gate 105 is provided with a locking means 108.

A further modification of the present invention is illustrated in FIG. 8. A single pair of inflatable sealing elements 103 is mounted on one side of the flange portion 102 with the individual sealing elements 103 being in a side-by-side relation with each other. On the opposite side of the flange portion 102 a pair of solid, continuous sealing strips 109 are securely fastened to the beam 101 with each sealing strip 109 being directly opposite a corresponding inflatable sealing element 103. The sealing strips 109 are arranged to be in a slightly spaced relation to the reactor well wall 106 when the sealing elements 103 are in an uninflated condition. Upon inflation of the sealing elements 103, the expansion thereof will cause the elements 103 to contact the gate 105 and also urge the beam structure 100 away from the gate 105 and toward the interior of the access passageway 110. Accordingly, the sealing strips 109 will be pushed up against the reactor well wall 106 to complete the seal formed between the gate 105 and wall 106 by the sealing elements 103, beam 101 and sealing strips 109.

In all its various forms, the sealing means of the present invention provides a highly advantageous structure for insuring a leak-tight seal between the gate and reactor well wall. The unique beam structure is lightweight and easy to handle while forming a seal element supporting means around the perimeter of the gate. The inflatable sealing elements are conveniently mounted by the beam structure between the gate and wall for reliable operation to form a leak-tight seal. Thus, the present invention provides an apparatus highly suitable for utilization in the unique environment defined by a nuclear reactor power plant.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a nuclear fuel reactor well or the like including an access passageway provided with an openable gate structure for closing said access passageway, a removable pneumatic action sealing means associated with said gate structure and operable to form a leak-tight seal between the gate structure and reactor well, which comprises
   (a) said gate structure being movable between open and closed positions in relation to said access passageway,
   (b) a lightweight frame structure independent of the gate structure, removably mounted between said gate structure and said reactor well and defining an elongated support means generally congruent in outline with the outer perimeter of said gate structure when mounted between said gate structure and the access passageway,
   (c) inflatable sealing means mounted on said support means and operable to expand between said gate structure when in said closed position and said reactor well to form a leak-tight seal therebetween, and
   (d) means whereby the frame structure may be lifted and removed from its mounted position between the gate structure and reactor well.

2. The sealing means of claim 1, further characterized by
   (a) said frame structure comprising a generally U-shaped beam arranged and configured to extend along an area adjacent the perimeter of said gate structure, when the beam structure is mounted between the gate structure and reactor well, and
   (b) means on said beam for mounting said inflatable sealing means.

3. The sealing means of claim 2, further characterized by
   (a) a pair of said sealing elements disposed in each of said three-sided channels and each individual sealing element being in a side-by-side relation with the other sealing element of the pair whereby upon inflation of said sealing elements, one pair will expand to contact the gate structure and the other pair will expand to contact said reactor well.

4. The sealing means of claim 2, further characterized by
   (a) a plurality of transverse bars extending between the legs of said U-shaped beam,
   (b) a plurality of brackets mounted on the gate structure and arranged to receive and support said transverse bars to removably support the sealing means.

5. The sealing means of claim 1, further characterized by
   (a) said inflatable sealing means being arranged in oppositely facing pairs whereby, upon inflation, one sealing element of a pair engages said gate structure and the other sealing element of said pair engages said reactor well.

6. The sealing means of claim 2, further characterized by
   (a) said yieldable, expansible sealing elements each including a flange portion, and
   (b) said means for mounting the inflatable sealing means comprising a plurality of clips mounted within said three-sided channels and engaging the flange portions of each sealing element.

7. The sealing means of claim 2, further characterized by
   (a) said beam being generally T-shaped in cross-section and arranged in said U-shaped configuration whereby a portion of the beam extends along a plane parallel to the plane of the gate structure, and
   (b) said inflatable sealing means being supported on the parallel portion of the beam.

8. The sealing means of claim 7, further characterized by
   (a) said inflatable sealing means being disposed on one side only of said parallel portion, and
   (b) solid sealing strip means being disposed on the opposite side of said parallel portion, whereby upon inflation of said sealing means, the sealing means will expand to form with the sealing strip means a leak-tight seal between the gate structure and reactor well.

9. An inflatable removable sealing means for forming a leak-tight seal between the wall of a structure and a gate associated with said structure, wherein the wall structure and gate include
   (a) an access passageway formed in said structure wall,
   (b) said gate being movable to open and close said access passageway, the inflatable removable sealing means comprising
   (c) a separate, lightweight beam, independent of the gate structure, removably disposed between said gate and the wall and arranged and configured to define supporting surfaces extending opposite the outer perimeter of the gate when the gate is positioned to close said access passageway, (d) means associated with said lightweight beam for engaging and removing said lightweight beam from between the gate and wall, and (e) inflatable sealing means mounted on the supporting surfaces, (f) said sealing means being operative to expand between the gate and wall to thereby form a leak-tight seal therebetween.

10. The sealing means of claim 9, further characterized by (a) said sealing means including at least one axially elongated, inflatable tube-like member, (b) said member being expansible upon inflation to form the leak-tight seal between the gate and wall.

11. In a nuclear fuel reactor well or the like including an access passageway provided with an openable gate structure for closing said access passageway, a removable, pneumatic-action sealing means associated with said gate structure and operable to form a leak-tight seal between the gate structure and reactor well, which comprises (a) a lightweight frame structure removably mounted between said gate structure and said reactor well and defining an elongated support means generally congruent in outline with the outer perimeter of said gate structure, (b) inflatable sealing means mounted on said support means and operable to expand between said gate structure and said reactor well to form a leak-tight seal therebetween, and (c) means whereby the frame structure may be lifted and removed from its mounted position between the gate structure and reactor well, (d) said frame structure comprising a generally U-shaped beam arranged and configured to extend along an area adjacent the perimeter of said gate structure, when the beam structure is mounted between the gate structure and reactor well, and (e) means on said beam for mounting said inflatable sealing means, (f) said beam comprising an I-beam defining two oppositely-facing, three-sided channels, (g) the open side of one of said channels facing said gate structure and the open side of the other of said channels facing said reactor well, and (h) said inflatable sealing means comprising axially elongated, yieldably expansible sealing elements disposed within at least one of said three-sided channels, (i) said sealing elements being inflatable to expand beyond the confines of the channel to form a leak-tight seal between the gate structure and reactor well.

* * * * *